United States Patent [19]
Hansson

[11] Patent Number: 6,065,906
[45] Date of Patent: May 23, 2000

[54] KEY FOR INSERT HOLDERS OF THE BLADE TYPE

[75] Inventor: Per Hansson, Gävle, Sweden

[73] Assignee: Sandvik AB, Sandviken, Germany

[21] Appl. No.: 09/222,764

[22] Filed: Dec. 30, 1998

Related U.S. Application Data

[63] Continuation of application No. PCT/SE98/01507, Aug. 24, 1998.

[30] Foreign Application Priority Data

Aug. 29, 1997 [SE] Sweden .................................. 9703115

[51] Int. Cl.[7] .............................. B23B 27/16; B23B 27/06
[52] U.S. Cl. .......................... 407/110; 407/107; 407/109; 82/160; 76/80
[58] Field of Search ..................................... 407/110, 107, 407/108, 109; 82/160; 76/80; 81/176.1, 176.15, 176.2

[56] References Cited

U.S. PATENT DOCUMENTS

| | | |
|---|---|---|
| 4,588,333 | 5/1986 | Gustafson . |
| 5,035,545 | 7/1991 | Zinner . |
| 5,697,271 | 12/1997 | Friedman et al. . |
| 5,795,109 | 8/1998 | Jonsson et al. ...................... 407/110 X |
| 5,799,554 | 9/1998 | Friedman et al. ................... 407/110 X |
| 5,803,675 | 9/1998 | Von Haas .............................. 407/110 X |
| 5,899,643 | 5/1999 | Oehler ...................................... 407/110 |

FOREIGN PATENT DOCUMENTS

| | | |
|---|---|---|
| 0 654 316 | 5/1995 | European Pat. Off. . |
| WO97/02105 | 1/1997 | WIPO . |

*Primary Examiner*—Henry W. H. Tsai
*Attorney, Agent, or Firm*—Burns, Doane, Swecker & Mathis, L.L.P.

[57] ABSTRACT

A slot-widening key for use with insert holders of the kind that includes a blade shaped body having a slot intended to receive an insert. One surface of the slot is defined by an elastically flexible clamping arm for clamping the insert. The key has a shaft with two projections for engaging laterally opening seats in the body and the clamping arm, respectively. One of these two projections is provided on a pivoting link that is pivotably connected with the shaft via a hinge pin. The sum of a first distance between the hinge pin and one of projections, plus a second distance between the hinge pin and the other projection, is larger than the at-rest distance between the seats of the insert holder. Pivoting of the shaft beyond an unstable position of equilibrium thus makes the clamping arm deflect by a predetermined value for widening the slot. The key is self-supporting in the slot-widening position and does not require that the manual force be continuously applied.

8 Claims, 3 Drawing Sheets

KEY FOR INSERT HOLDERS OF THE BLADE TYPE

RELATED INVENTIONS

This is a Continuation application of International Application No. PCT/SE98/01507 filed on Aug. 24, 1998.

TECHNICAL FIELD OF THE INVENTION

The present invention relates to a key for insert holders of the kind that include a blade or disc shaped body having a slot intended to receive an insert, said slot being defined by an elastically flexible clamping arm provided to resiliently clamp the insert in the slot, said key comprising a shaft having two projections for engaging laterally opening seats in the body and the clamping arm respectively, more precisely in order to deflect the clamping arm so as to widen the slot in connection with the mounting and/or dismounting of an insert.

PRIOR ART

A clamping key of the kind generally defined above is previously known from FIGS. 6–8 of European Publication No. 0 654 316. In that case two projections are fixed upon a shaft, more precisely quite close to each other in the area of one end of the shaft. The fact that the projections are fixed upon the key shaft means, on one hand, that the user always has to apply a force upon the shaft in order to maintain the clamping arm deflected and the slot widened and, on the other hand, that the amount of deflection of the clamping arm will be effected in a way that is hard to control since the deflection is determined only by a discretionary judgement of the user in applying the force. Thus, if the user accidentally applies an excessive force upon the shaft there is a risk that the clamping arm will be subjected to a permanent, plastic deformation that in practice means that the insert holder in its entirety has to be rejected. Since the user has to permanently apply a manual force upon the shaft in order to maintain the slot widened (i.e., since the flexible clamping arm returns to a clamping position as soon as the user lets the shaft free) there occurs the further consequence that an exchange of inserts may be complicated to an unnecessary high degree, especially when the tool is located in such a way that it is difficult to reach. Thus, the key shaft has to be manually—and by a considerable force—kept in an active, slot widening position not only during the sequence when a worn insert is being removed from the slot, but also during a later sequence when a new insert is being positioned therein. It should also be mentioned that because of the short distance between the projections of the known key, the required lever action between the projections becomes mediocre and the user has to use a comparatively large manual force in order to deflect the clamping arm outwards.

SUMMARY OF THE INVENTION

The present invention aims at removing the shortcomings mentioned above in connection with the previously known clamping key and at creating an improved key. Thus, a primary object of the invention is to create a key that automatically, i.e., without depending upon the activities of the user, maximizes the deflection of the clamping arm in order to permanently keep the deflection within the elastic area. In other words the clamping arm must not by accident be deflected so far that a plastic deformation occurs. A further object is to create a key that is automatically maintained in the active position where the clamping arm is kept deflected and the slot widened in order to eliminate any need of the user to physically hold and apply a force upon the key shaft during the actual exchange of insert. Still an object of the invention is to create a key that is structurally simple and inexpensive to manufacture and makes it possible to deflect the clamping arm by using a moderate physical force.

According to the invention at least the primary object is attained by a key for widening a slot of a cutting insert holder that includes a blade-shaped body having a base and an elastically flexible clamping arm forming one surface of the slot. The key comprises a shaft having first and second abutment surfaces for engaging respective contact surfaces of the clamping arm and base, respectively. At least one of the first and second abutment surfaces is mounted on the shaft for movement relative to the other of the first and second abutment surfaces, whereby a distance between the abutment surfaces initially increases and then decreases in response to turning of the shaft in one direction during a widening of the slot.

The invention also pertains to a method of widening such a slot comprising the steps of:

A) positioning the key such that the first and second abutment surfaces engage the first and second contact surfaces, respectively;

B) manually turning the key such that a distance between the first and second abutment surfaces increases and becomes greater than the at-rest distance between the first and second contact surfaces, to elastically displace the clamping arm in a slot-widening direction; and C) continuing to turn the key such that the distance between the first and second abutment surfaces decreases while remaining greater than the at-rest distance between the first and second contact surfaces, whereby the key remains in a slot-widening state in the absence of the application of a manual force thereto.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF A PREFERRED EMBODIMENT OF THE INVENTION

Figure 2:
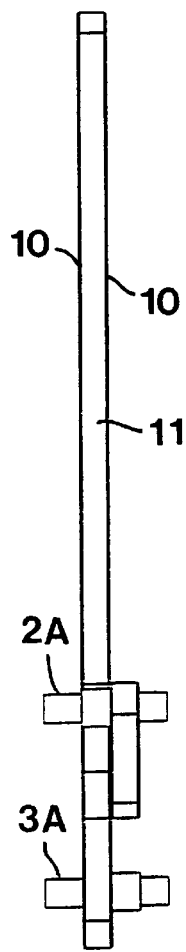
FIG. 2 is a side view seen along an edge surface of the same key.
Figure 1:
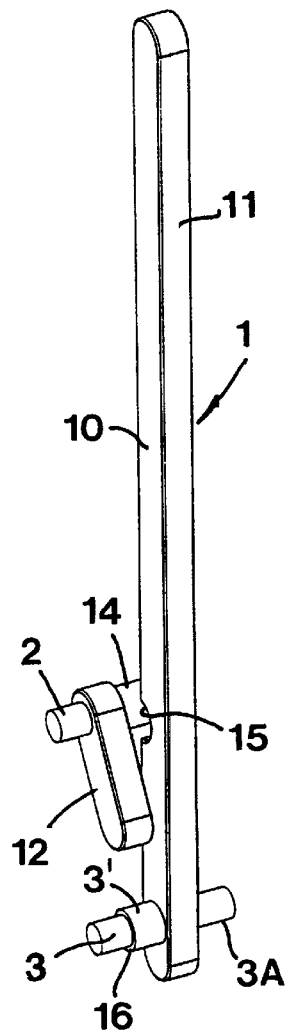
FIG. 1 is a perspective view of a clamping key according to the invention.
Figure 4:
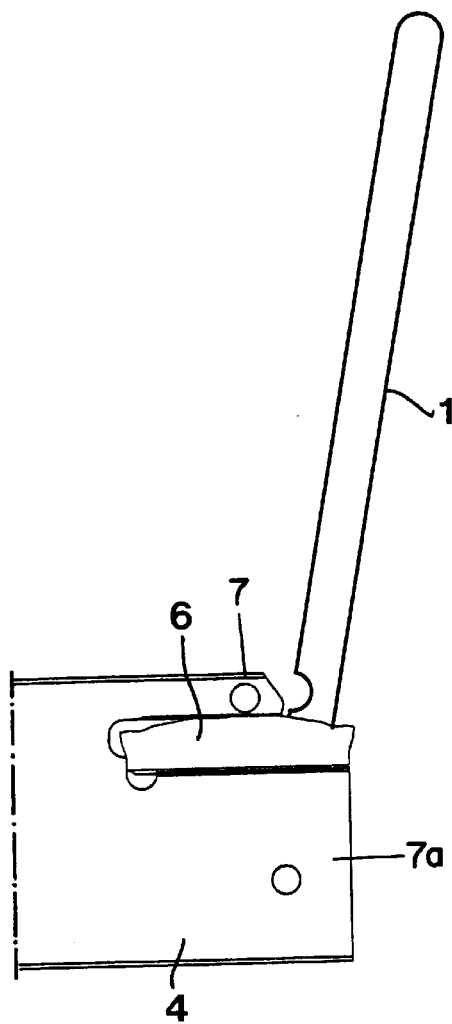
FIG. 4 is a partial side view showing an insert holder and an insert applied in said insert holder as well as a key according to the invention.
Figure 5:
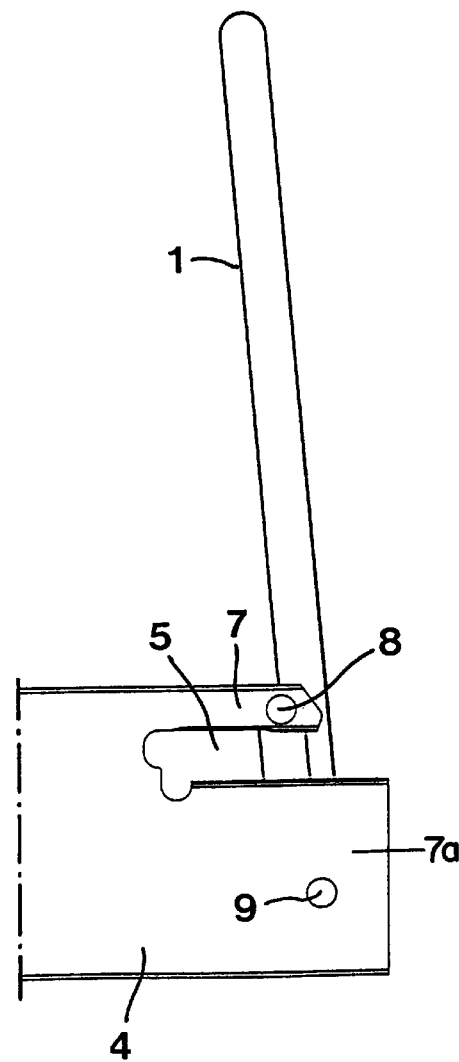
FIG. 5 is a side view corresponding to FIG. 4, though without any insert.
Figure 6:
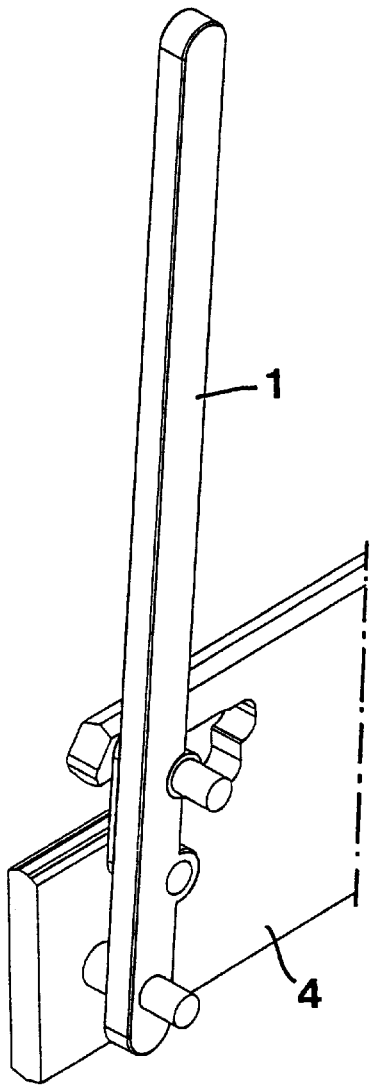
FIG. 6 is a perspective view showing the insert holder as well as the key in an active position when the clamping arm is deflected outwards.
Figure 7:
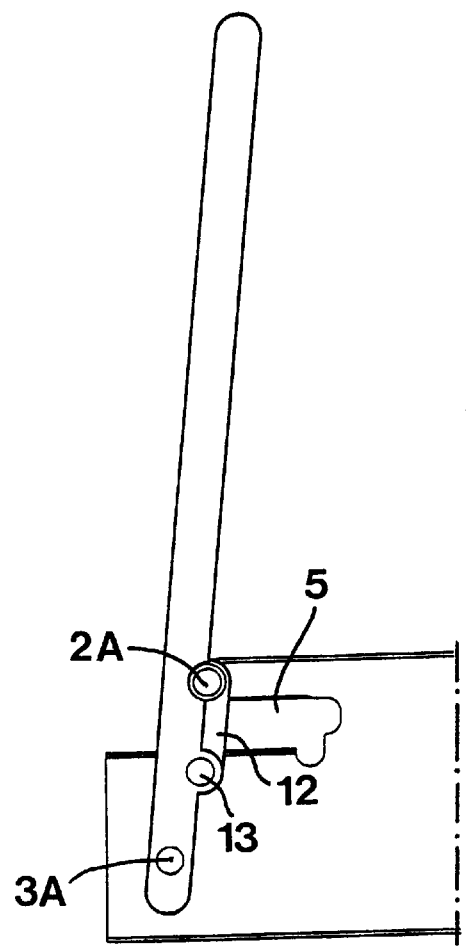
FIG. 7 is a side view showing the key as well as the insert holder in the same position as in FIG. 6.

The key shown in FIGS. 1 and 2 includes an oblong shaft 1 and two projections 2, 3 that project laterally from said shaft and define respective abutment surfaces. Before the key is described more in detail, reference is made to FIGS. 4 and 5 that illustrate an insert holder that in a known way is in the shape of a blade-shaped or disc-shaped shaped body 4 provided with a slot 5 that forms a seat for an insert 6. The slot is defined by a base 7a of the blade body and a comparatively narrow clamping arm 7 of the blade body, the arm being elastically flexible relative to the base 7a. The arm 7, due to its inherent elasticity, is able to clamp the insert in the desired position. Seats 8, 9 are recessed in the clamping arm 7 and the base 7a, respectively, as well as in the body 4, said seats 8, 9 defining respective contact surfaces and being adapted to receive the two projections 2, 3 of the key. These seats may either consist of through-going holes or of recesses that open only at one side of the insert holder.

As so far described, the key and the tool, composed of the insert holder and the insert, are in all essentials previously known.

Reference is again made to FIGS. 1 and 2 from which it is evident that the key shaft 1 has the shape of an oblong rod being rectangular in cross section. The rod presents two opposite, relatively wide longitudinal side surfaces 10 and two narrower edge surfaces 11. The dimensions of the shaft may vary depending on the dimensions of the insert and the insert holder. However, the length of the shaft should be within the range of 100 to 200 mm, while the width is 8 to 15 mm and the thickness 2 to 4 mm.

According to the invention the projection 2 is provided on a link 12 that is pivotably connected with the body 4 of the insert holder via a hinge or pivot pin 13. Consequently said link may pivot relative to the shaft. More precisely, the hinge 13 is located in the area of one end of the link while the projection 2 is located in the area of the opposite end.

As is evident from the drawing the projection 2 has the shape of a cylindrical pin. On the side of the flat link 12 that is opposite the pin 2 there is a third projection 14, also in the shape of a cylindrical pin. Said third pin 14 forms a stop element that restricts the extent to which the link can pivot relative to the shaft. In the shown, preferred embodiment the pin 14 co-operates with an arc-shaped recess 15 which opens in one of the two narrow edge surfaces 11.

The other projection 3, that likewise is in the shape of a cylindrical pin, is fixed upon the shaft, more precisely at a point located closer to one end of the shaft than the hinge 13. The diameter of the pin 3 (as well as the pin 2) is only slightly less than the diameter of the seat 9 (and the seat 8 respectively) recessed in the insert holder in order to have the pin inserted into the seat with a relatively close fit. Between the pin 3 and the shaft 1 there is a thickened material portion 3' having an annular shoulder surface 16. The axial extension of the material portion 3' is essentially equal to the thickness of the link 12. This guarantees that the shaft 1 will be oriented essentially parallel to the disc shaped holder 4 when the two pins 2, 3 are inserted into its adherent holes 8, 9.

Characteristic of the invention is that the center-to-center distance between the pins 2 and 3 when the key is at rest, is equal to a center-to-center distance between the seats 8 and 9 when the clamping arm is in an at-rest state, i.e., when the clamping arm is not being forced open by the key. However, the sum of: (i) the center-to-center distance between the hinge 13 and the pin 3, and (ii) the center-to-center distance between the hinge 13 and the pin 2, is at least somewhat larger than the at-rest distance between the two seats 8 and 9. That means that if the link 12 were pivoted such that the pin 2, the hinge 13, and the pin 3 all lay on a common line, then the center-to-center distance between the pins 2 and 3 would be greater than the at-rest distance between the seats 8 and 9. The advantage of this will become apparent.

Figure 3:
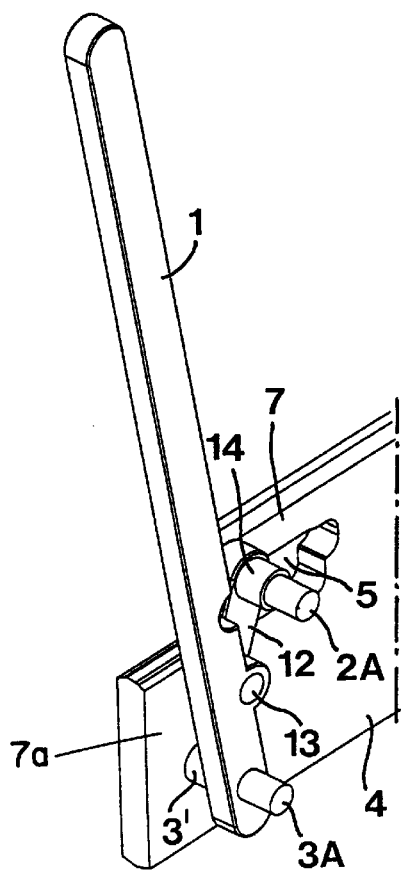
FIG. 3 is a perspective view showing the key in connection with an insert holder, more precisely in an initial position before the deflection of an adherent clamping arm.

As is evident from FIGS. 1–3, the pin 3 on one side of the shaft 1 has its counterpart also on the opposite side of the shaft, i.e., in the shape of a cylindrical pin 3A. In an analogous way there is a cylindrical pin 2A on the opposite side of the link 12, said pin corresponding to the pin 2. The pin 2A constitutes a prolongation of the stop pin 14, more precisely in the shape of a material portion having a smaller diameter than the material portion that forms the stop pin 14. By the presence of the cylindrical pins 2A and 3A the key may be selectively oriented with either one of its two opposite sides facing the insert holder.

Function and the Advantages of the Invention

When the insert 6 is to be removed the key is initially applied in an initial position (see FIGS. 3 and 4) in which the pins 2, 3 engage the seats 8, 9, respectively, and in which the link 12 is spaced a distance from the shaft. From this initial position the shaft is pivoted manually in a direction towards the stop pin 14, said pin 3 serving as a hinge point for the pivoting motion. In a given pivoting position, where the stop pin 14 is still distanced from the recess 15, the geometrical center of the hinge 13 will intersect an imaginary straight line extending through the centers of the seats 8, 9. In this state, constituting an unstable position of equilibrium, the hinge 13, the pin 2, and the pin 3 will all lie on a common line. As mentioned earlier, that means that the center-to-center distance between the pins 2 and 3 is larger than the distance between the seats 8, 9. Accordingly, the elastic clamping arm 7 in this position will have been deflected to widen the slot 5. From that unstable position of equilibrium, the shaft may be pivoted further a short distance until the stop pin 14 completely engages the recess 15, i.e., contacts its bottom. In this end position the center-to-center distance between the pins 2 and 3 has decreased somewhat in comparison with the corresponding distance in the unstable position of equilibrium. Nevertheless the center-to-center distance between the pins 2 and 3 in said end position is still larger than the at-rest distance between the seats 8 and 9, so the slot remains widened. Furthermore, since the shaft cannot be returned to the initial position without somewhat widening the slot even farther, a force is inherently created which maintains the key in a state in which the clamping arm is maintained in a deflected state in order to allow the insert 6 to be freely removed out of the slot without a manual force being applied to the key. That is, the shaft can be manually released without the clamping arm returning to its original position.

While the key is still applied in the end position mentioned above, a new insert (or the same insert indexed by 180° may be inserted in the widened slot. Not until an insert is again in position in the slot, need the shaft of the key be pivoted back to its initial position. At that time, the clamping arm again firmly clamps the insert while the shaft during its return movement passes through the unstable position of equilibrium wherein the slot is widened to a maximum degree.

The described clamping key has several advantages. An important advantage is that the maximum amount of deflection of the clamping arm is predetermined to be at a value where a plastic deformation cannot be caused. Thus the clamping arm may never be deflected farther than what is defined by the maximum distance between the pins 2, 3 (i.e., when the hinge 13 passes the unstable position of equilibrium). In other words the user may not accidentally use an uncontrolled large force to deform the clamping arm in such a way that it becomes useless. Another advantage is that the key may automatically be maintained on the insert holder during the exchange of insert, i.e., without any need for the user to hold it. By the geometry of the key it is thus guaranteed that the hinge 13—from the unstable position of equilibrium—may pass a short distance beyond the straight line between the seats 8, 9 and safely be maintained in an irreversible way in its inner end position, since the clamping arm 7, due to its inherent elasticity, permanently strives to keep the shaft pivoted towards its inner end position. The fact that the key is automatically maintained in its inner end position, while the slot is continuously widened, allows the operator to dismount and re-mount respectively an insert at different times without having to handle the key. A further advantage of the clamping key according to the invention is that the transmission ratio between the comparatively long shaft and the relatively short lever arm that is constituted by the distance between the hinge 13 and the pin 2, is comparatively large, this guaranteeing that even rigid clamping arms will be deflected by using a reasonable manual force.

Feasible Modifications of the Invention

The invention is not solely restricted to the embodiment described and shown in the drawings. Thus it is feasible to provide the first projection 2, and the second projection 3 on respective pivotable links. In such a case, each projection is applied to a link that is connected with the shaft by an individual hinge, said projections being connected with each other by a third link. Thus, the essential thing according to the invention is that at least one of the projections is provided on a pivoting link so as to vary the distance between the projections by pivoting the shaft, more precisely from an initial position in which said distance corresponds to the distance between the seats of the insert holder and the clamping arm is stressfree, to a maximum value where the distance between the projections is, on one hand, sufficiently large to provide a widening of the slot, but, on the other hand, not so large that the clamping arm will run the risk of being plastically deformed. It should also be mentioned that the key may include two links, for instance links whose distance to the hinge are different in order to be able to use the key in connection with different insert holders.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A key for widening a slot of a cutting insert holder that includes a blade-shaped body having a base and an elastically flexible clamping arm forming opposing surfaces of the slot, the key comprising a shaft having first and second projections forming respective first and second abutment surfaces for engaging respective contact surfaces of the clamping arm and base, respectively, at least one of the first and second projections being mounted on the shaft for movement relative to the other of the first and second projections, whereby a distance between the first and second abutment surfaces initially increases and then decreases in response to turning of the shaft in one direction during a widening of the slot, wherein the key further includes a link mounted to the shaft by a pivot for pivotal movement about an axis, the pivot being spaced from the first and second projections, the pivot arranged to cross over an imaginary line interconnecting the first and second abutment surfaces during turning of the shaft in a slot-widening direction, whereby the key holds the clamping arm open without the application of a manual force to the key.

2. The key according to claim 1, wherein at least the first and second projections are in the shape of cylindrical pins.

3. The key according to claim 1, wherein the first projection is disposed on the link.

4. The key according to claim 3, wherein the second projection is fixed on the shaft at a location closer to an end of the shaft than to the axis.

5. The key according to claim 3, wherein a third projection is provided at one side of the link that is opposite the first projection, the third projection constituting a stop element for stopping the pivoting motion of the link by abutting the shaft.

6. The key according to claim 3, wherein the second projection is fixed on the shaft, and disposed between the second projection and the shaft there is a thickened portion having a length that corresponds to a thickness of the link.

7. The key according to claim 1, wherein the shaft is in the shape of an oblong rod having a rectangular cross section, the rod having two opposite wide surfaces and two opposite, narrower edge surfaces.

8. A method of widening a slot in a cutting insert holder of the type including a blade-shaped body having a base and an elastically flexible clamping arm projecting from the base and forming opposite surfaces of the slot, the blade-shaped body including a first contact surface on the clamping arm and a second contact surface on the base, the first and second contact surfaces defining an at-rest distance between one another when the clamping arm is at rest, the method comprising the steps of:

A) positioning a key such that a first abutment surface disposed on a first projection of the key engages the first contact surface, and a second abutment surface disposed on a second projection of the key engages the second contact surface, the first projection disposed on a link pivotably mounted on the key by a pivot spaced from the first and second projections;

B) manually turning the key such that a distance between the first and second abutment surfaces of the key initially increases, to elastically displace the clamping arm in a slot-widening direction; and C) continuing to turn the key such that the pivot crosses over an imaginary line interconnecting the first and second abutment surface whereby the distance between the first and second abutment surfaces of the key decreases, whereby the key remains in a slot-widening state in the absence of the application of a manual force thereto.

* * * * *